USO05467861A

United States Patent [19]
Weskamp

[11] Patent Number: 5,467,861
[45] Date of Patent: Nov. 21, 1995

[54] CONVEYOR WITH THREE PLANE LOCKING SYSTEM

[76] Inventor: Robert Weskamp, 720 Dartmouth Dr., Buffalo Grove, Ill. 60089

[21] Appl. No.: 189,267

[22] Filed: Jan. 31, 1994

Related U.S. Application Data

[63] Continuation-in-part of Ser. No. 959,888, Oct. 13, 1992, abandoned.

[51] Int. Cl.⁶ .................................................. B65G 47/00
[52] U.S. Cl. ......................................................... 198/345.3
[58] Field of Search ............................. 198/343.1, 345.3, 198/346.1, 465.1; 29/714, 701, 709

[56] References Cited

U.S. PATENT DOCUMENTS

| 5,002,175 | 3/1991 | Drexel et al. | 198/345.3 |
| 5,007,527 | 4/1991 | Ach et al. | 198/346.1 X |
| 5,090,556 | 2/1992 | Ach et al. | 198/465.1 |
| 5,143,195 | 9/1992 | Bloecker | 198/345.3 |
| 5,170,876 | 12/1992 | Sticht | 198/345.3 |
| 5,242,043 | 9/1993 | Sturm | 198/345.3 |

Primary Examiner—James R. Bidwell
Attorney, Agent, or Firm—Baker & McKenzie

[57] ABSTRACT

An improved combination carrier and stop assembly is provided for use in automated conveyor assembly systems. The carrier includes a reject pin having two positions that flags defective workpieces and further confirms that non-defective workpieces have passed the previous quality checks. The carrier also includes an improved mechanism for being grasped and lifted by the stop assembly unit of the present invention thereby enabling the stop assembly unit to grasp and lift the carrier and workpiece above the forwardly moving conveyor. The stop assembly detects the presence of a carrier, automatically checks the defective/non-defective status of the workpiece and thereafter grasps and lifts the carrier and workpiece above the conveyor if a task is to be performed. The stop assembly also includes an air-assisted release mechanism to facilitate the release of the carrier from the stop assembly after the task is performed. A programmable controller controls the moving parts of the stop assembly.

21 Claims, 7 Drawing Sheets

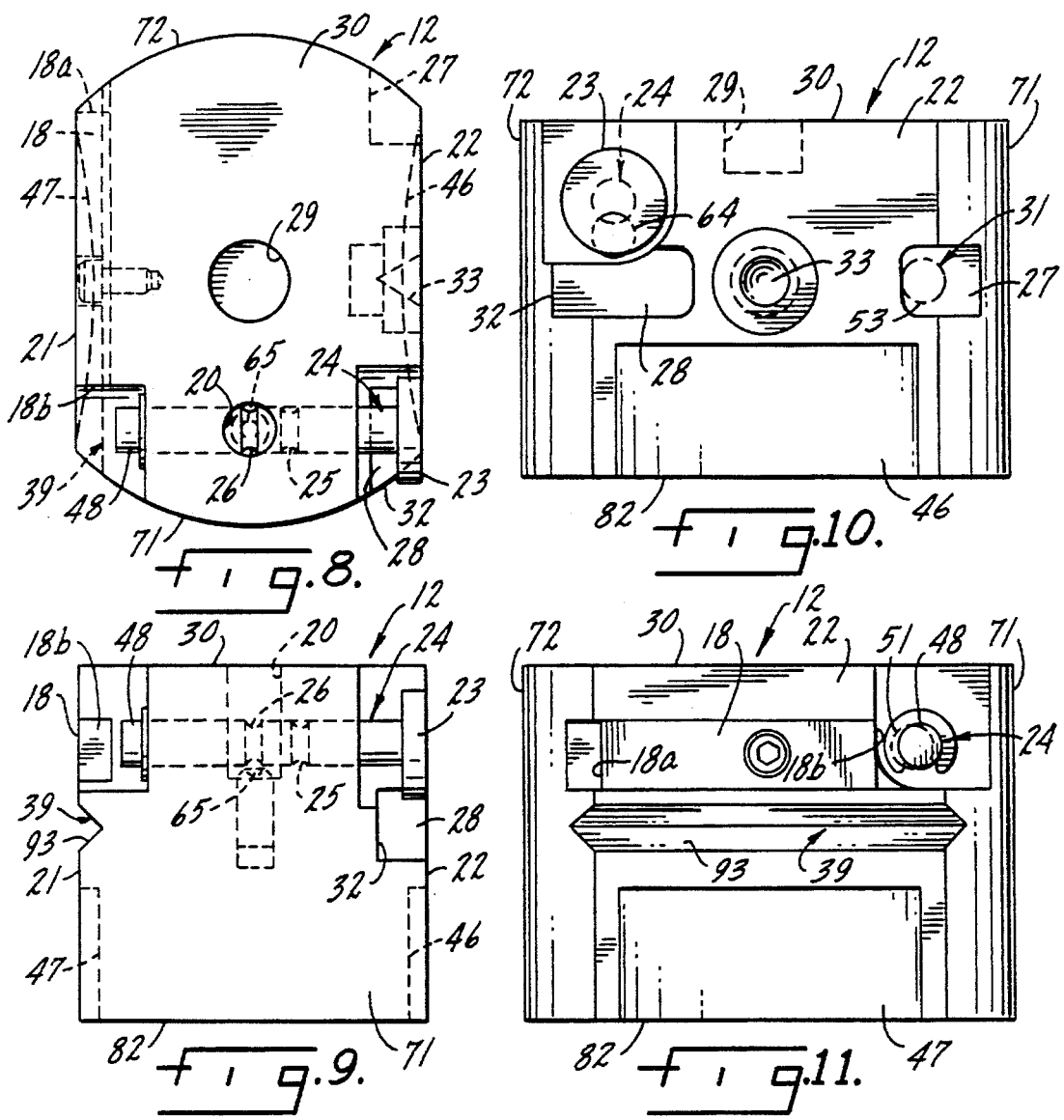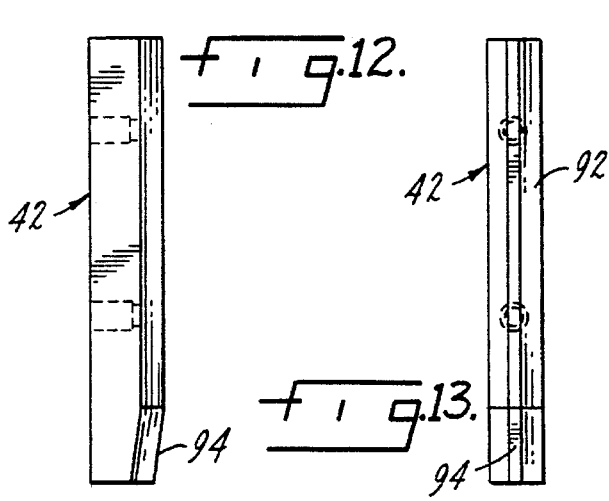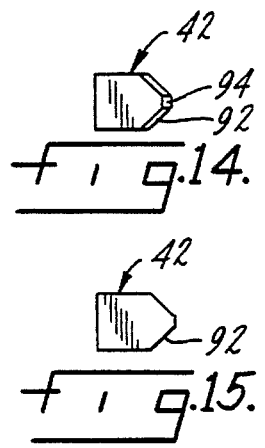

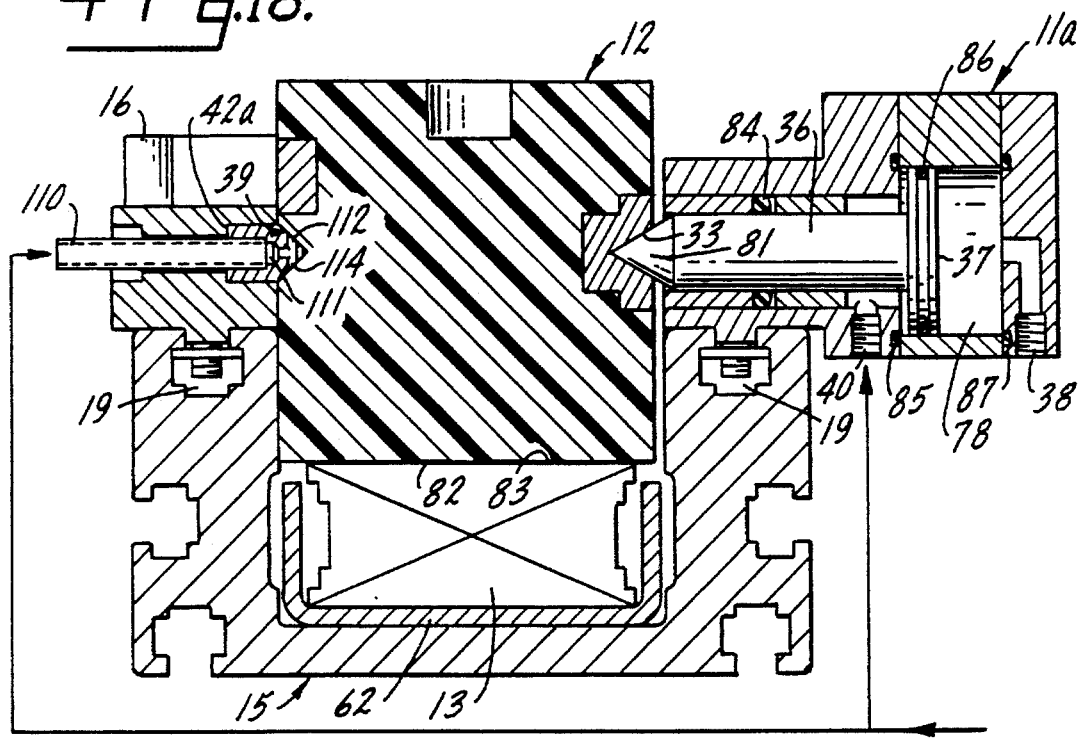
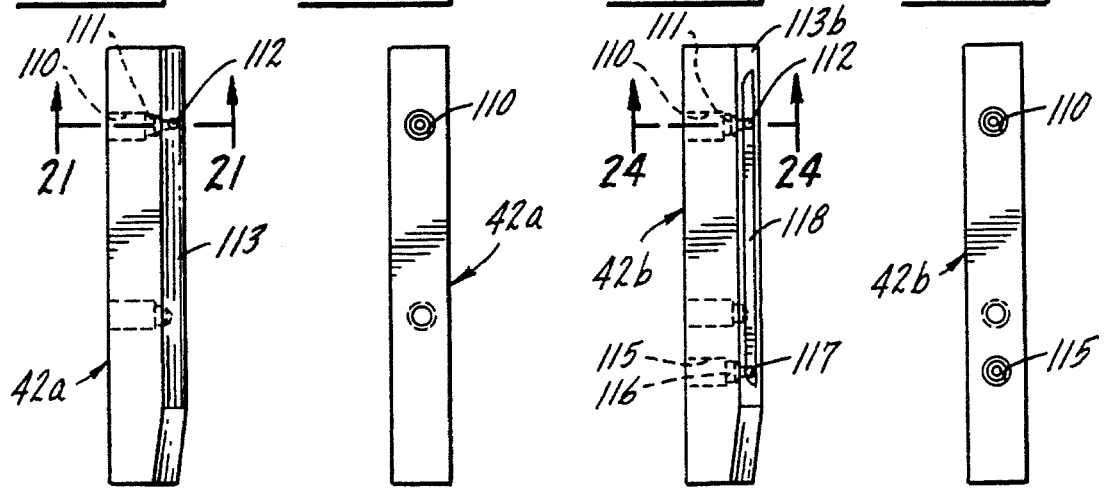
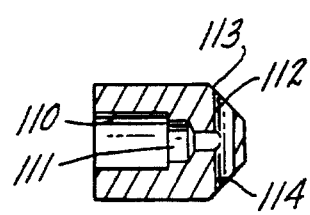
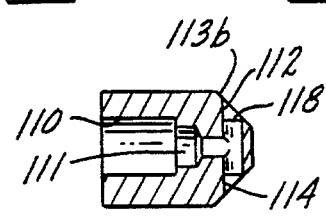

CONVEYOR WITH THREE PLANE LOCKING SYSTEM

This application is a continuation-in-part application of U.S. patent application Ser. No. 07/959,888 filed on Oct. 13, 1992 now abandoned.

FIELD OF THE INVENTION

This invention relates generally to conveyor systems for use in automated assembly systems. More specifically, this invention relates to conveyor systems for use in both synchronous and asynchronous assembly systems. The combination of the improved carrier and the improved precision stop assembly of the present invention enables the carrier to be stopped, grasped and lifted slightly by the stop assembly to enable an assembly task to be performed on the workpiece mounted on the carrier while enabling the conveyor to proceed forwardly underneath the carrier. The operation of the conveyor is not disrupted by the performance of the assembly task. Quick release of the carrier from the stop assembly is provided by an air assisted release mechanism.

BACKGROUND OF THE INVENTION

Automated conveyor systems are well known. Automated conveyor systems in current use include synchronous assembly systems, asynchronous or non-synchronous assembly systems and machine tool loading systems.

In a synchronous assembly system, a workpiece proceeds through each stage of the assembly process and does not proceed to the next stage until the remaining workpieces are ready to proceed to the next stage (i.e. each workpiece is in synch with the other workpieces). In synchronous assembly systems, the stage or task that takes the greatest amount of time will limit the rate at which all other tasks or stages can be completed because the other workpieces on the conveyor do not proceed to the next stage until all workpieces, including the workpiece at the slowest stage, are ready to proceed to the next stage.

In asynchronous assembly systems, each assembly task is performed by physically removing the workpiece from the conveyor, performing the task and returning the workpiece to the conveyor where the workpiece is transported to the next stage. The conveyor in asynchronous assembly systems is always moving. However, workpieces are removed from the carrier so that slower tasks or stages do not necessarily slow down the optimum velocity of the conveyor.

In the assembly of any multiple component part, some tasks take longer than others. If one task takes longer than the remaining steps, the longer step will limit the rate of production. To alleviate this problem, many systems include divide sections whereby the longer task is performed in multiple to keep at least one part with the longer task completed moving down the conveyor at all times.

In robotic systems, the preferred asynchronous assembly system includes a carrier for transporting the workpiece through the assembly system. When the carrier and workpiece reach an assembly point, a robotic arm or other mechanism lifts the carrier and workpiece above the conveyor system allowing the conveyor to proceed forward without the carrier and workpiece. If the task to be completed includes the application of a significant amount of force or pressure to the workpiece, it is often been necessary to have the robotic arm move the carrier and workpiece away from the conveyor. This movement requires time and additional hardware to accomplish. Thus, there is a need for a stop assembly, or work stop assembly, that will grasp the carrier, efficiently lift the carrier above the conveyor system and enable the assembly task to be performed to the workpiece directly above the conveyor system. Such a combination stop assembly and carrier system must provide support for the workpiece in all three planes, or the X, Y and Z planes.

In addition to robotic machines performing more assembly functions, there is a movement toward automatic testing or gauging of workpieces as they are assembled or machined. Typically, a workpiece may be tested after every two or three assembly tasks are performed. After a workpiece is been determined to be defective, it must be removed from the assembly line or re-routed to a re-testing station or a repair station. Physically removing the carrier and workpiece from the conveyor system can be costly and time consuming.

A better system would be to flag or otherwise mark the carrier in such a way so to indicate to stop assemblies downstream that the workpiece is defective and no task should be performed. Thus, there also is a need for an improved combination carrier and stop assembly system that enables the carrier to be marked as one carrying a defective workpiece so that stop assemblies downstream from where the defect is detected do not waste time by performing additional assembly tasks (or processing or machining) on a defective workpiece. The "flagged" carrier may then be rerouted at the appropriate place downstream.

Another problem not addressed by the prior art is the 90° turning requirements of many assembly lines. Linked conveyors or transport systems that can turn at 90° angles are known. However, many carrier units that rest on top of the moving conveyor cannot turn at 90° angles with short radiuses without getting jammed in the side walls of the conveyor support structure. Often, special tracks or special conveyor systems must be designed specifically for the 90° turns thereby adding to the cost of the entire assembly system. Thus, there is a need for a narrow carrier unit that will ride on top of a linked conveyor and that will further proceed through a 90° turn with a short radius without undue interference with the side walls of the conveyor system.

Yet another problem not addressed by the prior art is the tendency of carriers to get stuck or hung up at work stop assemblies. Specifically, if the work stop assembly includes a grasping and lifting mechanism for holding the carrier above the conveyor while the task is performed, the carrier can get stuck or hung up on the grasping mechanism. If the carrier is unable to leave the work stop assembly, succeeding carriers will not be able to enter the work stop assembly and the continuity of the manufacturing process will be interrupted.

BRIEF DESCRIPTION OF THE INVENTION

The present invention makes a significant contribution to the art of automatic conveyor systems by providing an improved combination carrier and precision stop assembly for use in automatic conveyor systems. The combination includes two primary components: (1) an improved carrier; and (2) an improved stop assembly. The result is an conveyor system with higher transfer speeds and shorter index periods.

The carrier includes an upper surface for supporting a workpiece and a means for attaching the workpiece to the upper surface of the carrier. The under surface of the carrier rests on, and frictionally engages the moving conveyor. The front end of the carrier preferably includes a means for receiving an initial braking mechanism or stopping mechanism of the stop assembly. In the preferred embodiment, a slot is provided in the front end of the carrier to receive the initial braking mechanism of the stop assembly. The carrier may also be designed so that the front end of the carrier simply engages or bumps into the initial braking mechanism.

After the carrier arrives at the stop assembly and is stopped by the initial braking mechanism, the carrier must be raised above the moving conveyor belt. The stop assembly includes means for engaging the opposing sides of the carrier and means for lifting the carrier above the conveyor. The carrier includes complimentary means for engaging the opposing sides of the stop assembly so that the carrier may be grasped and lifted by the stop assembly. In the preferred embodiment, the stop assembly includes a rod and piston, or a first projection, that is ejected from one side of the stop assembly and engages a hole, or a means for receiving the first projection, disposed in one side of the carrier. The rod engages the hole and drives the carrier toward the opposing side of the stop assembly. A slot, or means for receiving a second projection of the stop assembly, is provided in the carrier on the side opposite to the side including the hole. A complimentary wedge, or second projection, is provided in the stop assembly on the side of the stop assembly opposite to the location of the rod and piston. Thus, when the rod engages the hole and drives the carrier unit to the opposing side of the stop assembly, the slot in the carrier is mateably engaged over the wedge of the stop assembly.

The above-mentioned rod and wedge of the stop assembly provide the means for grasping and lifting the carrier. The above-mentioned hole and slot of the carrier provide the means for engaging opposing sides of the stop assembly.

In the preferred embodiment, the rod and the hole are tapered to compliment one another. Specifically, a conical hole and conical rod is an effective combination. The system is designed so that the engagement of the tapered, or conical rod in the tapered, or conical hole and the complimentary engagement of the elongated slot and elongated wedge act to raise the carrier slightly creating a gap between the bottom of the carrier and the top surface of the moving conveyor. This slight lift of the carrier above the conveyor enables the conveyor to proceed in a forward direction without interference from the under side of the now stopped carrier.

The preferred carrier includes at least two devices for activating sensors or proximity switches. A metal block or other detectable material is attached to one side toward the front end of the carrier for alerting a first sensor or proximity switch of the presence of the carrier at the stop assembly. A second sensor looks for the position of the reject pin mounted toward the rear end of the carrier. The reject pin includes at least two positions: a first position indicating that the workpiece is not defective; and a second position indicating that the workpiece is defective. The reject pin is preferably made of metallic substance or other substance that maybe easily detected by a sensor such as a proximity switch. The reject pin may take the form of a switch or other movable part with at least two positions, one position to indicate defects and another position to indicate no defects.

Alternatively, sensors disposed on opposing sides of the carrier will detect at least three positions of a reject pin: far left, far right and center, thereby providing a reject pin capable of sending three signals to the programmable controller.

The improved stop assembly in the present invention is a two-sided assembly disposed on both sides of the moving conveyor and may be mounted to the conveyor support. The stop assembly includes movable pistons and rods that are preferably driven by air pressure. A first movable piston and rod is the initial braking mechanism which extends outward and engages the front slot of the just-arriving carrier to stop it. At this point, the carrier is substantially stopped and the metal block on the carrier is detected by first sensor or proximity switch which alerts the programmable controller that the carrier has arrived at the stop assembly. The second sensor or proximity switch determines if the reject pin is in the position indicating that the workpiece is defective or in the position indicating that the workpiece is not defective.

If the second proximity switch, or sensor, detects that the reject pin is in the position indicating that the workpiece is not defective, then the programmable controller a second piston and rod which engages the hole on one side of the carrier. The rod engages the hole and drives the carrier toward the opposing side of the stop assembly thereby engaging the slot in the opposing side of the carrier over the wedge of the opposing side of the stop assembly and lifting the carrier above the moving conveyor as noted above.

In stop assemblies that perform quality tests and/or re-tests, a third and fourth piston and rod mechanisms are required. Specifically, if the stop assembly performs a quality test and workpieces determine to be defective, a piston and rod is required to drive the reject pin to the position indicating that the part is defective. Similarly, if the stop assembly is performing a re-test after a repair or simple re-test and the workpiece is determined to be not defective or no longer defective, another piston and rod may be required to drive the reject pin from the position indicating defect to the position indicating no defect.

Thus, communication linkages are required between the programmable controller and the first sensor indicating the presence of the carrier, the second sensor indicating the position of the reject pin, the means for activating the initial braking mechanism, the means for activating the tapered or conical rod (first projection), the means for activating the reset piston/rod for resetting the reject pin position and the means for activating the reject piston/rod for activating the piston and rod that moves the reject pin from the non-defective to the defective position.

Also included in the preferred embodiment of the carrier is an additional rear slot that enables the initial braking system to be activated before the carrier has completely departed from the stop assembly. The rear slot is disposed on the side of the carrier adjacent to the initial braking mechanism and extends rearward through the rear of the carrier. Because the rear slot is open ended at the rear end of the carrier, the initial braking mechanism may activated before the carrier has fully departed from the stop assembly and the initial braking mechanism will be accommodated in the rear slot but will not engage the carrier and will not stop the carrier from proceeding forward to the next stop assembly.

Preferably, the stop assembly includes an air-assisted release mechanism. Once the second rod (which forces the carrier onto the wedge) is withdrawn, the wedge may include one or more air ports that "blow" the carrier off of the wedge enabling the force of gravity to lower the carrier down onto the conveyor. The air port or ports disposed in the wedge may also be in communication with the retract port for the second piston so that air is supplied to the wedge when air is supplied to retract the second piston.

The combination carrier and precision stop assembly lends itself to an improved method of performing an assembly task. A carrier resting on a moving conveyor arrives at a stop assembly. The carrier is stopped by initial braking mechanism and the presence of the carrier is thereafter detected by a first sensor. A signal from a second sensor initially detects whether the carrier is transporting a defective or non-defective workpiece. If the workpiece is non-defective, the stop assembly engages opposing sides of the carrier and lifts it above the conveyor. The programmable controller instructs the means for activating the piston and rod (first projection) to engage the hole (means for engaging the first projection) in the carrier which drives the carrier to the opposing side of the stop assembly where a slot (means for engaging the second projection) in the carrier positively engages the wedge (second projection) disposed on the opposing side of the stop assembly. This action raises the carrier above the moving conveyor enabling the conveyor to proceed forward without interference. At this point, the assembly task is performed on the non-defective workpiece. After the assembly task is performed, the initial braking system is withdrawn (or may be withdrawn earlier when the carrier is lifted above the conveyor). Then, air is supplied contemporaneously to both withdraw the piston and rod and to provide outward air flow through the wedge to assist in the release of the slot disposed in the carrier from the wedge.

If the workpiece is defective, the rod does not engage the hole. Rather, the initial braking system is immediately released and the carrier, carrying the defective workpiece, proceeds to the next stop assembly which will either let the defective workpiece go through untouched, will reroute it, or conduct a repair task.

In the preferred embodiment of the carrier, an arcuate relief or undercut is provided on the lower portion of each side. The undercut enables the carrier to proceed through a 90° or other sharp turn with a small radius. Specifically, the undercut accommodates the inner guide roller of the turn. This is an important development because the turning portion of the conveyor system is normally wasted conveyor space. It is difficult and expensive to construct the stop assembly unit on a turn or a portion of the conveyor that is not straight. Therefore, 90° turns are preferably made as quickly, or with a small a radius as possible. Thus, a carrier that can proceed unhindered through a 90° turn with a small radius is an important development.

Another aspect of the shape of the carrier worth noting is the curvature of the front and rear ends of the carrier in combination with the curved undercuts provided in both sides of the carrier. The curvature of each end of the carrier enables a string of carriers lined up end-to-end to proceed around a sharp turn without interfering with the track support or otherwise hanging up in the middle of the turn. Carriers with straight sides and with squared-off ends cannot proceed around sharp turns and cannot proceed around turns lined up in an end-to-end fashion.

It is therefore an object of the present invention to provide a carrier unit with an improved means for receiving an initial braking mechanism.

Another object of the present invention is to provide a carrier unit that can be easily grasped and lifted above a moving conveyor.

Still another object of the present invention is to provide an air-assisted release mechanism to facilitate the departure of carriers from work stop assemblies.

Yet another object of the present invention is to provide a carrier unit with an improved method of flagging defective parts and enabling the flag mechanism to be reset automatically.

Another object of the present invention is to provide a carrier unit that is easily detected when it arrives at a stop assembly.

Another object of the present invention is to provide a carrier unit configured to pass through sharp turns in an assembly line and further to pass through sharp turns in an assembly line without interfering with the carrier unit abutting the front or rear end of the carrier unit.

Another object of the present invention is to provide a stop assembly with an improved method of grasping and raising a carrier and workpiece above the moving conveyor and thereafter providing support for the carrier and workpiece in the X, Y and Z planes.

Yet another object of the present invention is to provide a stop assembly with an improved system for detecting and flagging defective workpieces.

Yet another object of the present invention is to provide an improved stop assembly for retesting and/or repairing defective workpieces and resetting the flag mechanism indicating that the workpiece is defective.

It is still another object of the present invention to provide an improved carrier unit that may proceed through a 90° turn with a small radius.

Other objects and advantages of the invention will become apparent upon reading the following detailed description and appended claims, and upon reference to the accompanying drawings.

BRIEF DESCRIPTION OF THE DRAWINGS

This invention is illustrated more or less diagrammatically in the accompanying drawings, wherein:

FIG. 7 is a sectional view taken substantially along line 7—7 of FIG. 1;

FIG. 8 is a top view of a carrier shown in FIG. 1;

FIG. 9 is rear-end view of a carrier shown in FIG. 1;

FIG. 10 is a right-side view of a carrier shown in FIG. 1;

FIG. 11 is a left-side view of a carrier shown in FIG. 1;

FIG. 12 is a top view of the wedge of the stop assembly shown in FIG. 1;

FIG. 13 is a right-side view of the wedge shown in FIG. 12;

FIG. 14 is a front-end view of the wedge shown in FIG. 12;

FIG. 15 is a rear-end view of the wedge shown in FIG. 12;

FIG. 18 is a sectional view taken substantially along line 5—5 of FIG. 1 particularly illustrating the carrier as it is grasped and lifted above the carrier by the stop assembly, and further illustrating air ports disposed in the wedge for air-assisted release of the carrier from the stop assembly;

FIG. 19 is a top view of the wedge of the stop assembly shown in FIG. 18;

FIG. 20 is a rear side view of the wedge shown in FIG. 19;

FIG. 21 is a sectional view taken substantially along line 21—21 of FIG. 19;

FIG. 22 is a top view of an alternative embodiment of the wedge shown in FIG. 19, particularly illustrating the use of dual air ports;

FIG. 23 is a rear side view of the wedge shown in FIG. 22; and

FIG. 24 is a sectional view taken substantially along line 24—24 of FIG. 22.

Figure 1:
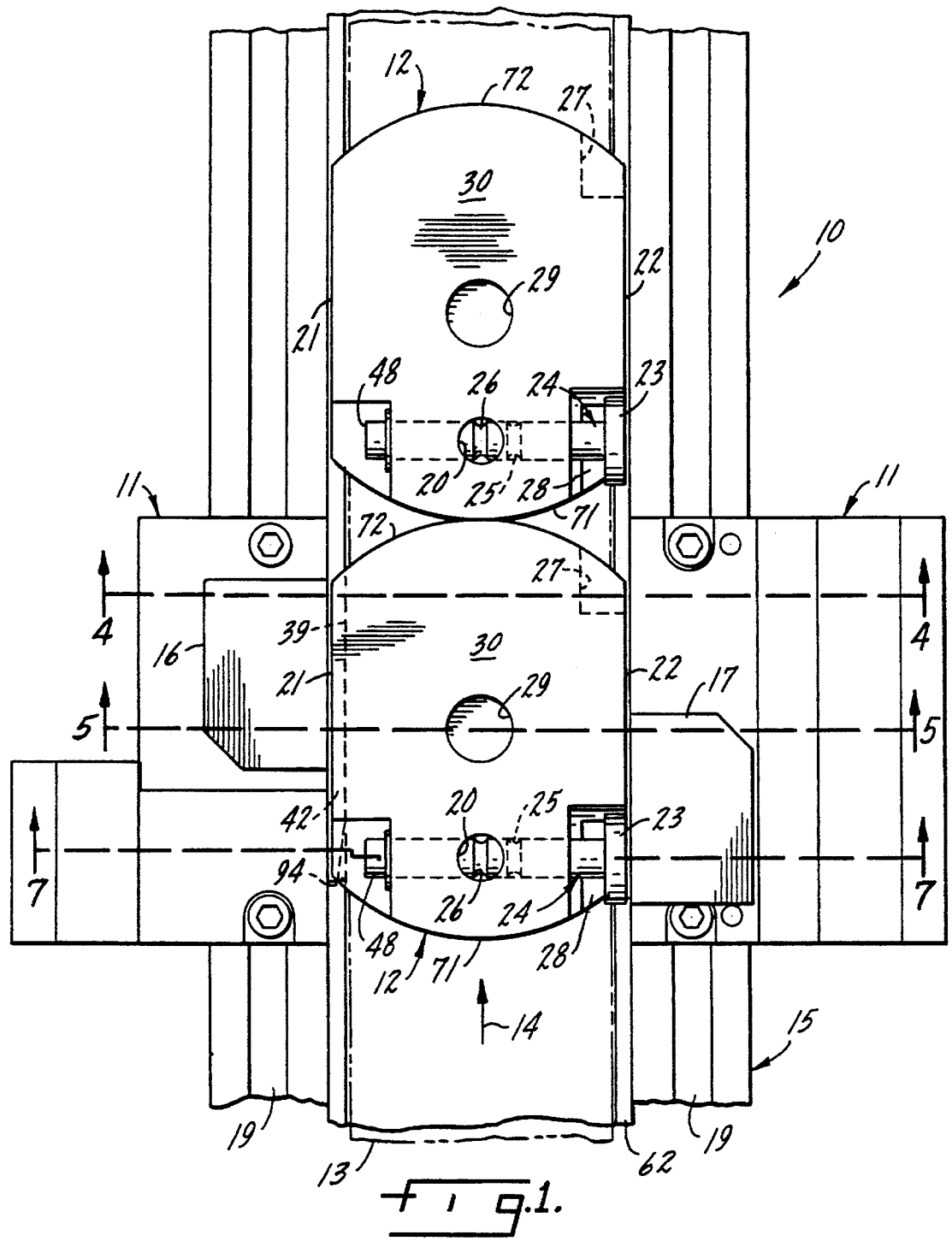
FIG. 1 is a top plan view of a carrier in a stop assembly and a carrier leaving the same stop assembly, both the carriers and stop assembly being made in accordance with the preferred embodiments of the present invention.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE INVENTION

Like reference numerals will be used to referred to like or similar parts from Figure to Figure in the following description of the drawings.

Referring first to FIG. 1, a combination carrier/stop assembly 10 is shown including the stop assembly 11 and two carriers 12, one having just entered the stop assembly 11 and the other just departing the stop assembly 11. The direction of travel of both the carriers 12 and the conveyor, indicated generally at 13, is indicated by the direction arrow 14. The conveyor 13 is disposed within a track support, indicated generally at 15.

The stop assembly 11 is disposed on either side of the conveyor 13. FIG. 1 also illustrates the two sensors 16, 17. Sensor 16 (or proximity switch 16) senses the arrival of the carrier 12 at the stop assembly by sensing the presence of a metal block 18 (see FIG. 3) on the left side 21 of the carrier 12 (the right side of the carrier 12 being designated as 22). The stop assembly 11 includes a means for communicating the signal of the sensor 16 from the sensor 16 to the programmable controller (not shown). Upon receiving the indication that the carrier 12 has arrived at the stop assembly 11, the programmable controller reads the incoming signal from the sensor 17.

The sensor 17 indicates the position of the head 23 of the reject pin, indicated generally at 24. When the head 23 of the reject pin 24 is disposed toward the right side 22 of the carrier 12, the workpiece (not shown) is indicated to be non-defective, or the workpiece has passed the last quality check. If the head 23 of the reject pin 24 is disposed inward so that the groove 25 is disposed under the hole 20 where groove 26 is shown in FIG. 1, then the workpiece is indicated to be defective and the prescribed task to be performed at the stop assembly 11 is not carried out. In the embodiment shown in the Figures and described herein, if the sensor 17 detects the presence of the head 23 of the reject pin 24, the workpiece is deemed non-defective. If the sensor 17 cannot detect the presence of the head 23 because it is disposed to the left of the sensor 17, then the part is deemed defective. Of course, an opposite configuration could be employed and still fall within the scope of the invention.

As seen in FIG. 1, the head 23 of the reject pin 24 is disposed toward the right near the sensor 17 (or proximity switch 17) and the sensor 17 sends a signal to the programmable controller that the workpiece is not defective and the prescribed assembly task will be carried out.

The hole 29 disposed toward the center of the carrier 12 is intended to provide a means for affixing the workpiece (not shown) to upper surface 30 of the carrier 12. Of course, other suitable means for affixing a workpiece to the carrier 12 are available and will be apparent to those skilled in the art.

Figure 2:
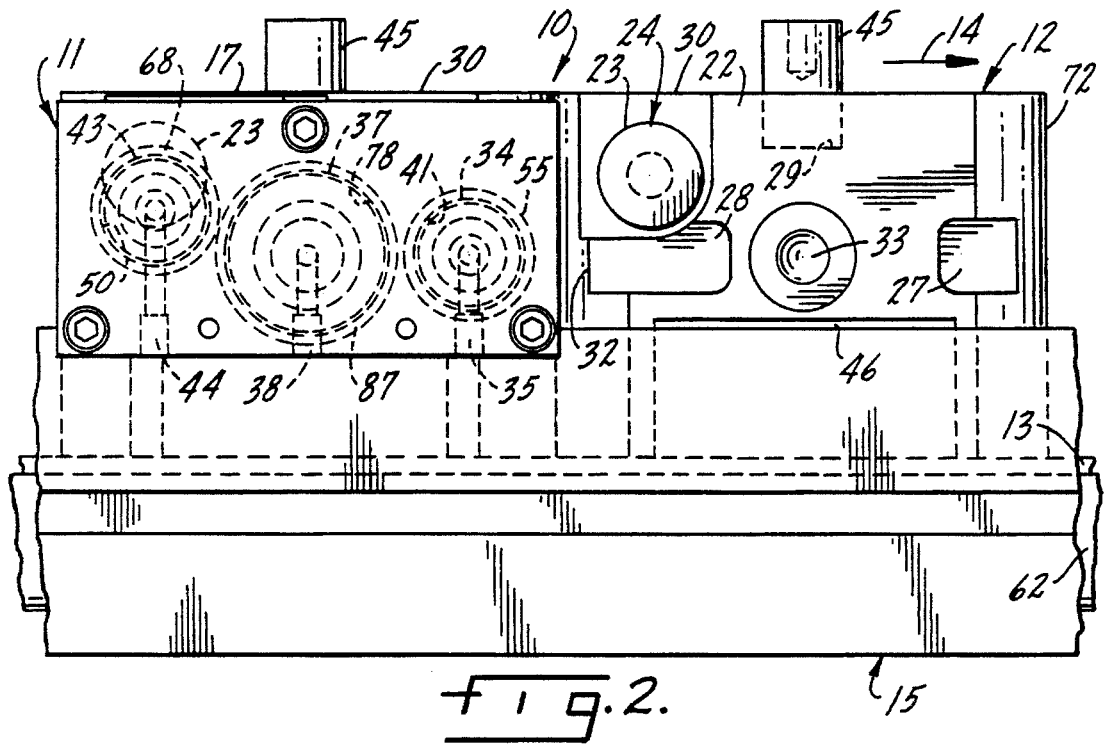
FIG. 2 is a right-side view of the stop assembly and carriers shown in FIG. 1.

Turning to FIG. 2, a right side view of the stop assembly 11 and a carrier 12 is shown. Referring first to the carrier 12 shown to the right of the stop assembly 11, the front slot 27 and rear slot 28 are illustrated. The front slot 27 is intended to receive or provide a means for receiving an initial braking mechanism or initial braking rod 31 (see FIG. 4) of the stop assembly 11. Essentially, the front slot 27 is the area of first contact between the carrier 12 and the stop assembly 11.

The rear slot 28 is also intended to accommodate the initial braking rod 31 (see FIG. 4) in the event the initial braking rod 31 extends outward prematurely as the carrier 12 leaves the stop assembly 11 or if the system is simply timed so that the initial braking rod 31 is intended to extend outward before the carrier 12 has completely departed from the stop assembly 11. Referring back to FIG. 2, the rod 31 can extend into the slot 28 and the carrier can still pass forward (to the right) without interference because the rear end 32 of the rear slot 28 is open and allows the rod 31 to pass through.

Referring again to FIG. 4, the means for activating the initial braking rod 31 includes a piston 34 and rod 31 disposed within a cylinder 41, and a supply of pressurized air (not shown), communication between the air supply and cylinder 41 is provided by the port 35. The air supply is controlled by the programmable controller (not shown).

Figure 5:
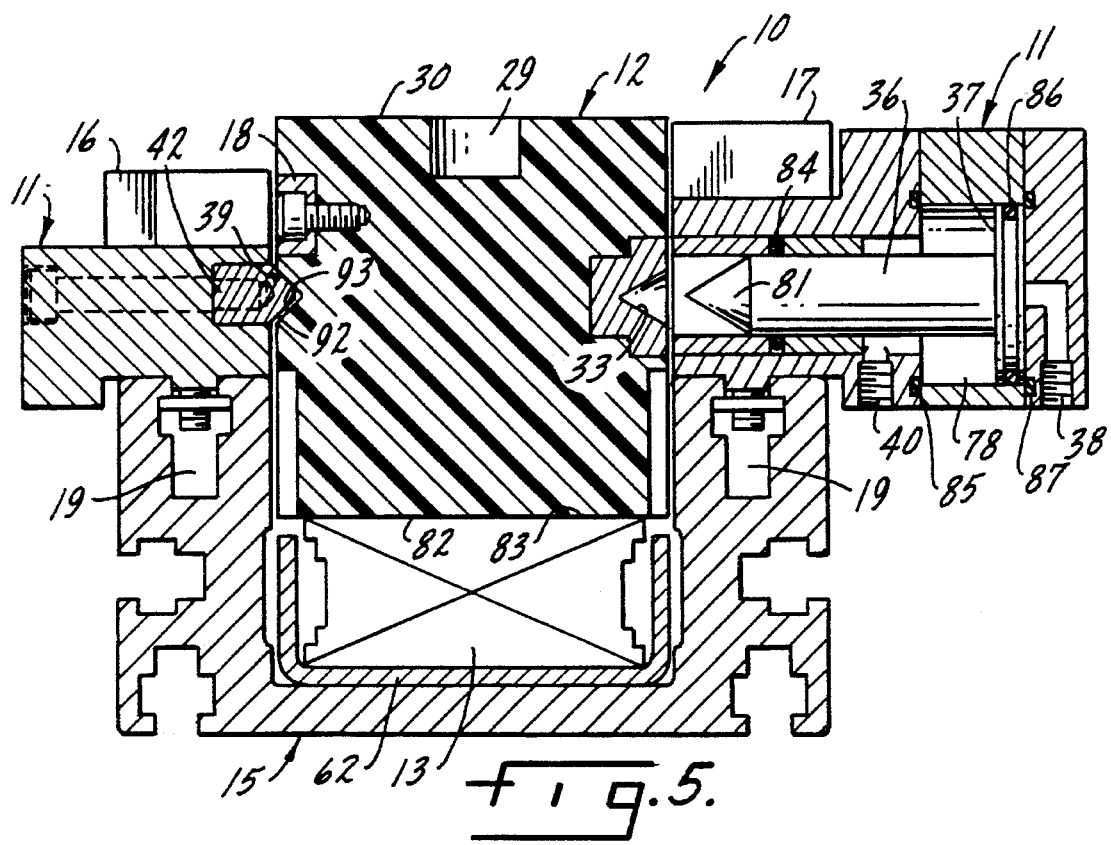
FIG. 5 is a sectional view taken substantially along line 5—5 of FIG. 1.
Figure 6:
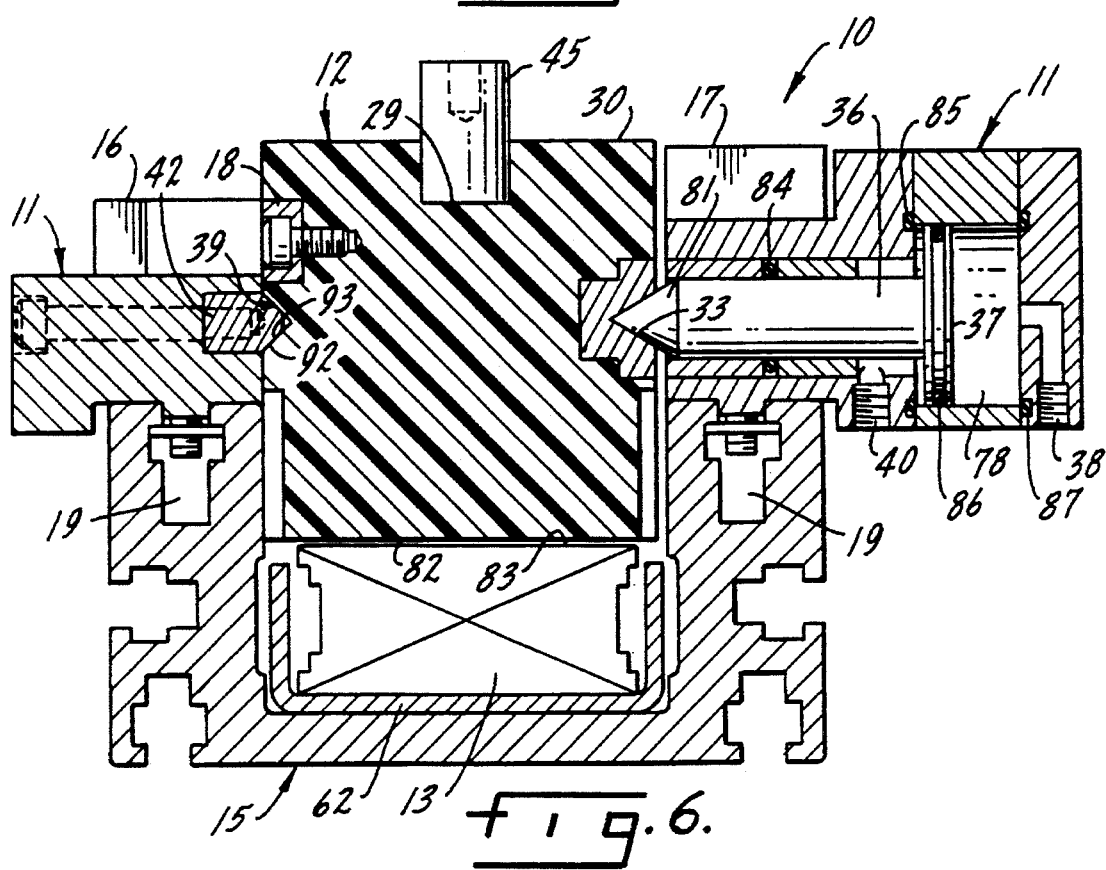
FIG. 6 is a sectional view taken substantially along line 5—5 of FIG. 1 particularly illustrating the carrier as it is grasped and lifted above the carrier by the stop assembly.

Returning to FIG. 2, the hole 33 disposed toward the center of the right side 22 of the carrier 12 accommodates a rod 36 (not shown in FIG. 2; see FIGS. 5 and 6). Turning now to FIGS. 5 and 6, the rod 36 and piston 37 are moved inward and outward via air or fluid pressure in the cylinder 78. Communication between the cylinder 78 and a pressurized air supply (not shown) is established through the port 38. As noted below, when the rod 36 engages the hole 33, the carrier 12 is moved toward the left (according to the orientation of FIG. 1) and the slot 39 (see FIG. 3) engages a wedge 42 (see FIG. 7) which results in the lifting of the carrier 12 (see FIG. 6) above the upper surface 83 of the conveyor 13.

Referring to FIGS. 2 and 7, the reject piston 43 and rod 64 move the reject pin 24 toward to the position indicating that the workpiece 45 is defective. Communication is established between the cylinder 50 and the pressurized air supply (not shown) by the port 44.

Figure 16:
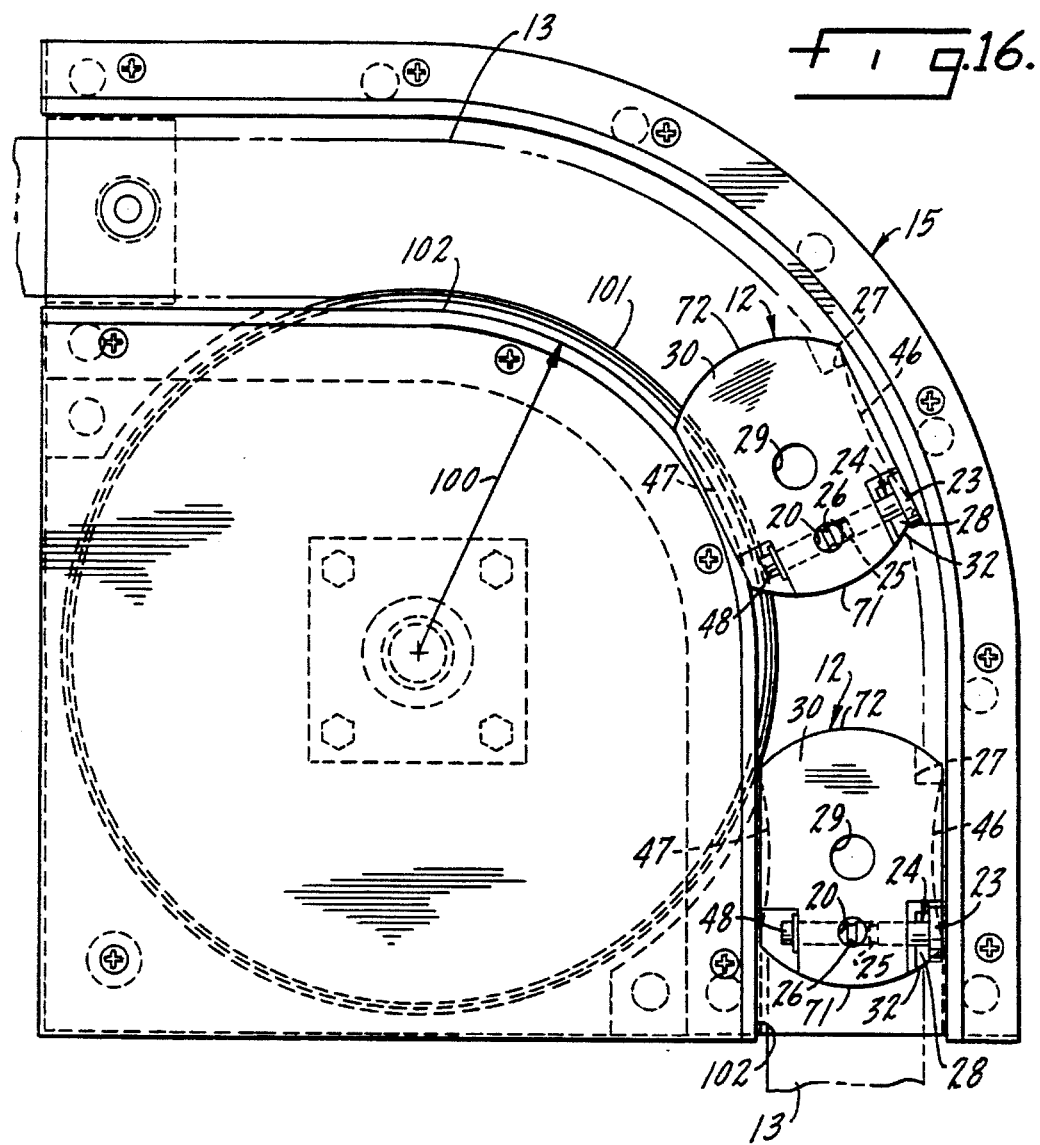
FIG. 16 is a top plan view of a 90° turn particularly illustrating the movement of two carriers made in accordance with the present invention proceeding through the turn.

Also seen in FIG. 2 is a view of the head 23 of the reject pin 24. The head 23 being disposed along the right side 22 of the carrier 12 thereby enabling it to be sensed by the sensor 17 (see FIG. 1). Also shown in FIG. 2 is a side view of the undercut 46 disposed on the right side 22 of the carrier 12 (see also FIG. 8). A like undercut 47 is disposed on the left side 21 of the carrier 12 as seen in FIG. 8. The undercuts 46, 47 facilitate the maneuvering of the carrier 12 around sharp turns as illustrated in FIG. 16.

Figure 3:
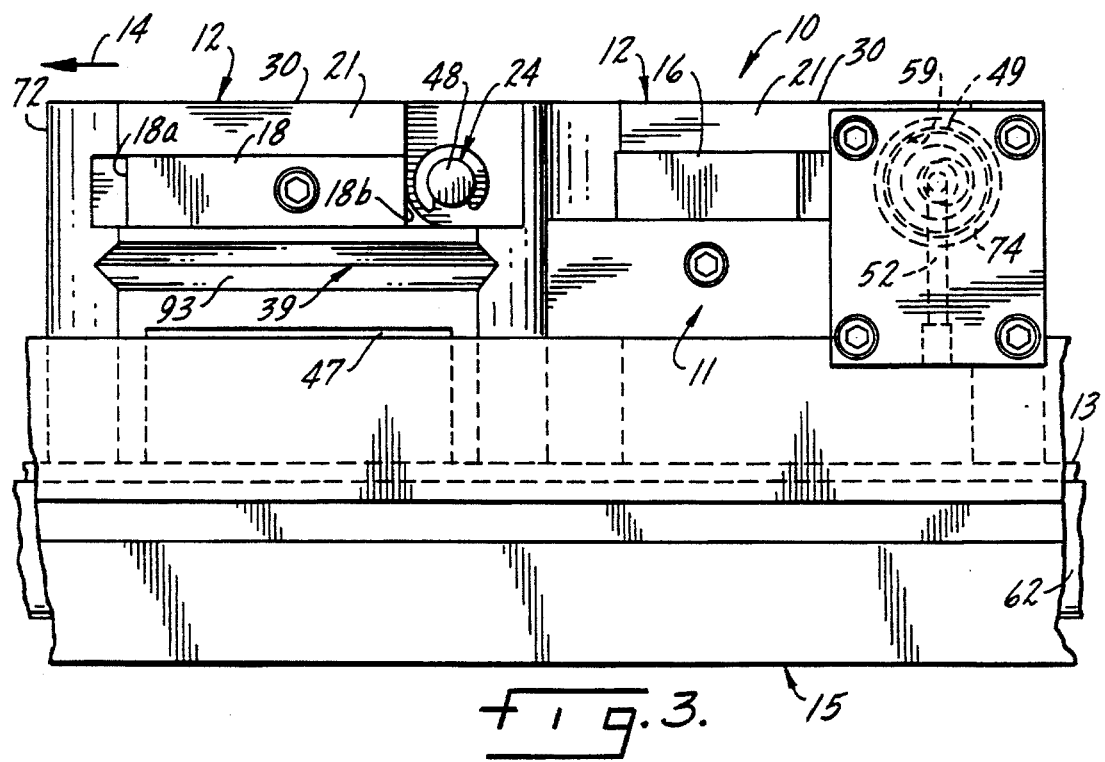
FIG. 3 is a left-side view of the stop assembly and carriers shown in FIG. 1.

Turning to FIG. 3, a left side view of the stop assembly 11 and carrier 12 is shown. As discussed above, the presence of the carrier 12 and the stop assembly 11 is sensed by a sensor 16 (see FIG. 1) which detects the presence of the metal block 18 disposed on the left side 21 of the carrier 12. Also disposed on the left side 21 of the carrier 12 is the distal end 48 of the reject pin 24. As noted above, if the particular stop assembly 11 shown were a testing and/or repair station, it is foreseeable that a defect in the workpiece 45 could be corrected and/or repaired. In this event, the reject pin 24 would to be reset to the position indicating that the workpiece 45 is not defective. To accomplish this end, a piston 49 and rod 51 (see FIG. 7) are provided to drive the distal end 48 of the reject pin 24 back to the position indicating that the workpiece 45 is not defective (see also FIG. 7). Also to be noted on the left side 21 of the carrier 12 is the elongated slot 39 which engages the wedge 42 (see FIG. 4) when the carrier 12 is grasped and lifted above the conveyor 13 by the stop assembly 11. The port 52 provides fluid communication between the piston 49 and the pressurized air supply (not shown).

The metal block 18 may be a strip of metal as opposed to a block of metal if the sole function of the block 18 is to be detected by the sensor 16. However, in the preferred embodiment, the block 18 also acts to engage a comb-like structure with teeth (not shown) that engage each end 18a, 18b of the block 18. The comb-like structure engages a group of carriers 12 by the blocks 18 and shuttles the carriers 12 forward together to a succeeding station.

Figure 4:
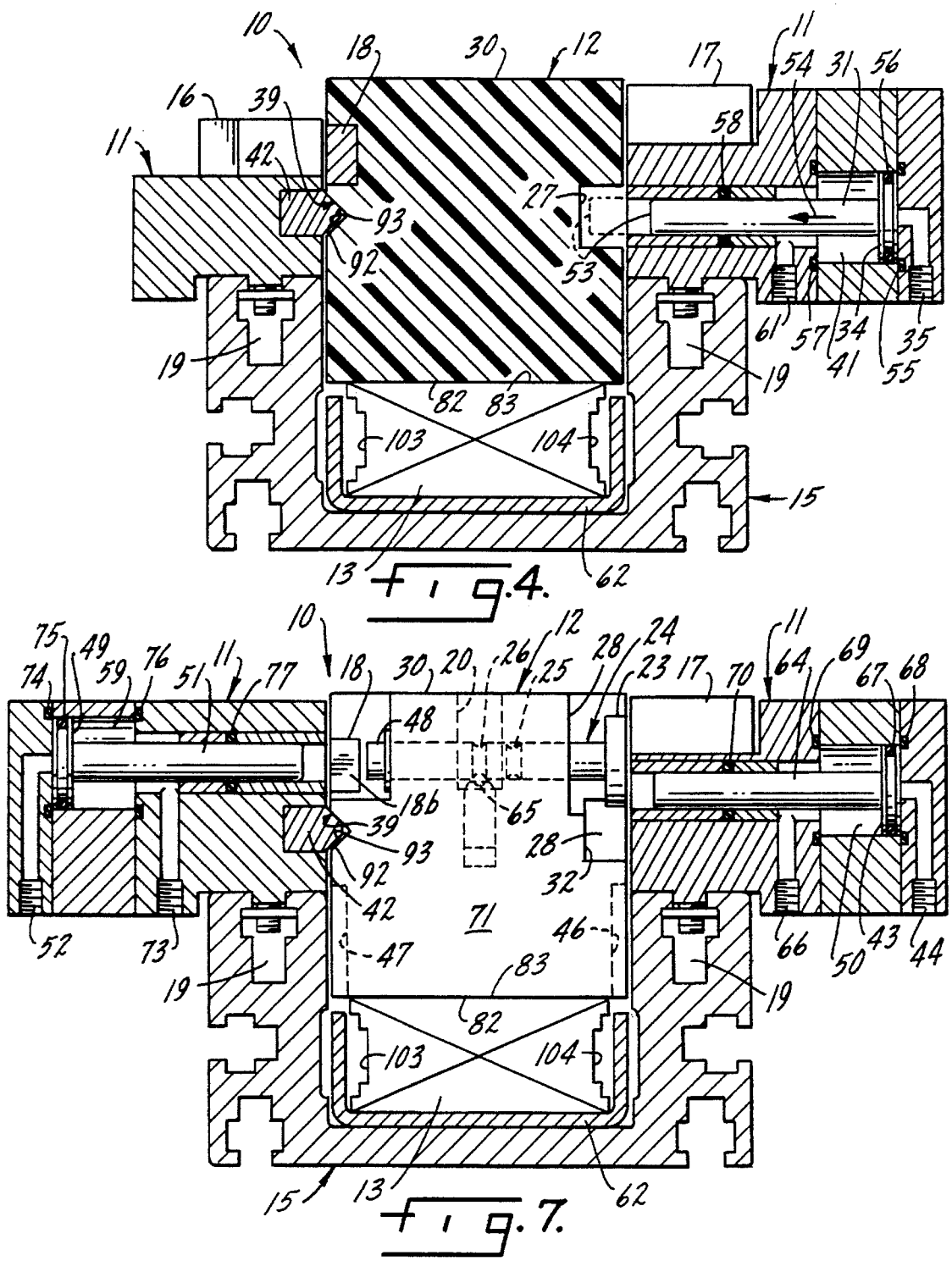
FIG. 4 is a sectional view taken substantially along line 4—4 of FIG. 1 particularly illustrating the initial braking mechanism.

The sectional view provided in FIG. 4 illustrates the action of the wedge 42 in the slot 39 and the action of the initial braking rod 31 in the front slot 27. Also to be noted from FIG. 4 is the proximity of the metal block 18 to the first sensor 16 as the carrier 12 enters the stop assembly 11. The track support 15 includes mounting slots 19 for attaching the stop assembly 11 to the track support 15.

As noted above, shortly after carrier 12 leaves the stop assembly 11, or during the departure of a carrier 12 from a stop assembly 11, the means for activating the initial braking mechanism 31 or the rod 31 is activated. The distal end 53 of rod 31 also initially engages the slot 27 as a carrier 12 enters the stop assembly 11. The means for activating the rod 31 and piston 34 is pressurized air that is supplied through the port 35 to the cylinder 41 to drive the piston 34 and rod 31 in the direction of the arrow 54 to the position shown in phantom in FIG. 4. Quad-rings indicated at 55, 56, 57 and 58 provide a seal and prevent escape of air pressure. In addition to quad-rings, O-rings and other sealing mechanisms may be employed. The initial braking rod 31 is released or moved to the right upon the application of pressurized air through the port 61 thereby driving the piston 34 to the right and into the retracted position shown in solid in FIG. 4.

As noted above, the sensor 16 is in position to detect the proximity of the metal block 18. And as shown in FIG. 7, the sensor 17 is in position to detect the proximity of the head 23 of the reject pin 24. The track support extrusion 15 supports a liner 62 which in turn supports a standard conveyor indicated generally at 13. The conveyor 13 employed in the preferred embodiment is sold under the name "Rex 1700" and is claimed in U.S. Pat. No. 4,436,200.

FIG. 7 illustrates the operation of the flag rod 64 and piston 43 and the reset rod 51 and piston 49. Air is supplied to the cylinder 50 through the port 44 which in turn drives the piston 43 and the rod 64 to the left to engage the head 23 of the reject pin 24. This action would move the groove 26 off the ball detent 65 and move the groove 25 over on top of the ball detent 65. This position would indicate that the workpiece 45 (see FIG. 2) is defective and that any prescribed task should not be performed on the workpiece 45. The rod 64 is withdrawn upon the application of pressurized air through the port 66 and through the cylinder 50 thereby driving the piston 43 back to the position shown in FIG. 7. Quad-rings 67, 68, 69 and 70 prevent air leakage and help ensure effective operation of the piston 43.

Turning to the reset piston 49 also shown in FIG. 7, pressurized air is supplied through the port 52 which drives the rod 51 to the right to reset the reject pin 24 from the position indicating that the workpiece 45 is defective to the position indicating that the workpiece 45 is not defective. The rod 51 is withdrawn upon the application of pressurized air through the port 73 which drives the piston 49 to the left. Quad-rings 74, 75, 76 and 77 prevent air leakage.

Returning to FIGS. 5 and 6, the grasping and lifting of the carrier 12 by the stop assembly 11 is illustrated. After the carrier 12 has arrived at the stop assembly 11 and the presence is indicated by detection of the metal block 18 by the sensor 16, the programmable controller verifies that the workpiece 45 is not defective by reading the signal from the sensor 17. Upon confirmation that the workpiece 45 is not defective (as indicated by the position of the reject pin 24 in FIGS. 1 and 7), a signal is sent to the means for activating the piston 37 and rod 36. Pressurized air is supplied through the port 38 to the cylinder 78 which drives the piston 37 and tapered rod 36 to the left as seen in FIG. 6. The engagement of the distal end 81 of the rod 36 in the tapered hole 33 drives the carrier 12 to the left as shown in FIG. 6. This action causes the slot 39 to fully engage the wedge 42 thereby lifting the carrier 12 above the conveyor 13. This action will be noted by the slight gap between the underside 82 of the carrier 12 and the upper surface 83 of the conveyor link 13 shown in FIG. 6. Quad-rings 84, 85, 86 and 87 prevent air leakage and provide effective operation of the piston 37. Pressurized air is supplied through the port 40 to retract the rod 36 and piston 37.

The sequence of operation of the carrier 12 in the stop assembly 11 is illustrated by viewing FIGS. 4 through 7. In FIG. 4, the carrier 12 has just arrived at the stop assembly 11 and the front slot 27 has been engaged by the distal end 53 of the initial braking rod 31 as shown in phantom. The under surface 82 of the carrier 12 is still resting on the upper surface 83 of the conveyor. The slot 39 is not positively engaged by the wedge 42 but a gap between the lower angled surface 92 of the wedge 42 and the lower angled surface 93 of the slot 39 is evident. The presence of the carrier 12 has been detected by the sensor 16 and the information has been sent to the programmable controller which has now received the signal from the sensor 17 indicating that the workpiece is not defective. A signal is sent from the programmable controller to the means for activating the piston 37 and rod 36 to provide pressurized air through the port 38 to the cylinder 78 to drive the piston 37 and consequently the tapered rod 36 into the tapered hole 33 (see FIG. 5). As seen in FIG. 6, the rod 36 engages the hole 33 and drives the carrier 12 to the left side of the stop assembly 11. This action causes the slot 39 to positively engage the wedge 42 thereby creating the gap between the under surface 82 of the carrier 12 and the upper surface 83 of the conveyor link 13 (see FIG. 6). The carrier 12, as shown in FIG. 6, is in the position whereby the conveyor 13 is free to move underneath the carrier 12 without interference and an assembly task may be performed on the workpiece 45. Rods 36 and 31 are subsequently retracted to lower the carrier 12 and allow it to depart from the stop assembly 11. The air-assisted release mechanism which is also a feature of the present invention is illustrated in FIGS. 18 through 24.

FIGS. 8 through 11 illustrate physical details of one embodiment of the carrier 12. Of course, alternative embodiments will be readily ascertainable by those skilled in the art without departing from the scope of the present invention. Turning to FIG. 8, a top view of the carrier 12 illustrates the undercuts 46, 47 for turning around right and left turns respectively. The front end 72 and the rear end 71 are curved to enable of group of carriers 12 to proceed through a sharp turn without jamming. If the ends 72, 71 are not curved and instead are square, the ends 72, 71 of each carrier 12 would engage one another thereby causing the carriers 12 to jam in the turn. The hole 29 provides a means for mounting the workpiece 45 but it will be understood that other mounting means are readily available. The reject pin 24 is in the position indicating that the workpiece is not defective. FIG. 8 also illustrates the open end 32 of the rear slot 28 which enables the initial braking rod 31 to be activated before the carrier 12 completely departs from the stop assembly 11.

FIG. 9 illustrated the two positions of the reject pin 24. As previously discussed in reference to FIG. 1, when the groove 26 is disposed on top of the ball detent 65, the workpiece 45 is deemed not defective. When the groove 25 is disposed over the ball detent 65, the workpiece 45 is deemed defective because the second sensor 17 does not detect the presence of the head 23 of the reject pin 24 (see FIG. 1). Of course, the defective and non-defective positions could be reversed and the flag mechanism could be embodied in a switch (or other multiple position part) other than the reject piston 24 without departing from the scope of the present invention. As noted above, more than two signals (defective/non-defective) may be obtained from the disclosed reject pin 24 concept. For example, two sensors disposed on opposing sides of the carrier could detect three positions of the reject pin (far left, far right and middle).

FIG. 10 and 11 illustrate the tapered hole 33/elongated slot 39 combination of the preferred embodiment. It will be noted that any combination that provides support for the carrier 12 in the X, Y and Z planes would be suitable for the purposes of the present invention. FIGS. 10 and 11 also include phantom views of the rods 64, 36 and 31 of the stop assembly 11.

FIG. 12 is an illustration of the wedge 42 disposed on the left side of the stop assembly 11. The front end 94 is tapered to the left thereby providing an easier opening to accommodate a carrier 12. A wedge 42a that is equipped with an air-assisted release mechanism is illustrated in FIG. 19.

Figure 17:
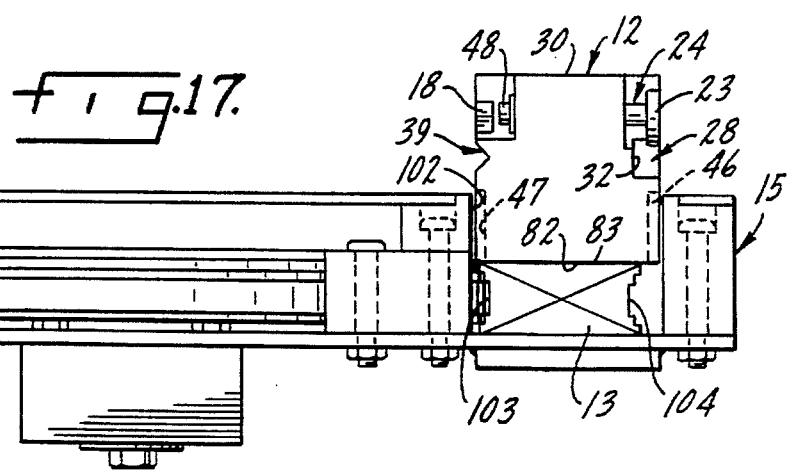
FIG. 17 is an end view of the 90° turn and a carrier shown in FIG. 16.

FIGS. 16 and 17 illustrate the ability of the carrier 12 of the present invention to make a 90° turn with a short radius 100. The conveyor track 13 is a standard conveyor consisting of relatively small links pivotally connected together that enable the conveyor to turn around sharp corners as the one indicated in FIG. 16. A guide roller 101 guides the conveyor around the turn. The guide roller 101 does not provide a driving mechanism for the carriers 12 in addition to the driving mechanism for the conveyor 13. The arcuate undercut 47 enables the carrier 12 to turn about the inner edge 102 of the track support 15. To accommodate the sharp turn illustrated in FIG. 16, a standard conveyor linkage 13 is utilized with indentations indicated at 103 and 104 to accommodate the guide roller 101. Thus, while it has been possible before to provide a conveyor 13 that could turn 90° at a radius 100, the present invention provides a carrier 12 that can make a sharp turn without undue modification of the carrier 12 or the track support 15.

Referring now to FIG. 18, the air-assisted release feature of the present invention is illustrated. Specifically, at least one conduit 110 is provided in the left side of the stop assembly 11a which terminates at a port 111 disposed in the wedge 42a. The conduit 110 and port 111 are in communication with the port 40 which is the release port for the rod 36 and piston 37 as discussed above with respect to FIGS. 5 and 6. Thus, to retract the rod 36 from the position shown in FIGS. 6 and 18 to the position shown in FIG. 5, air supplied through the port 40 and contemporaneously air supplied through the conduit 110 and through the port 111. As the rod 36 and piston 37 are retracted, air pressure is blown through the wedge 42 to assist in the release of the slot 39 from the wedge 42a. The slot 39 and carrier 12 are literally blown off the wedge 42a for a fast and efficient air-assisted release of the carrier 12 from the stop assembly 11a.

Turning to FIG. 19, the upper port 112 disposed in the upper angled surface 113 of the wedge 42a is illustrated. The lower port 114 is shown in FIGS. 18 and 21. Turning to FIG. 22, an additional conduit 115 and port 116 may be provided. As seen in FIG. 22, the two upper outlets 112, 117 may be connected via a channel or groove 118 disposed in the upper slanted surface 113b of the wedge 42b. As noted above, the air pressure supplied through one or two conduits 110, 115 assists in the release of the carrier 12 from the work stop assembly 11a because it prevents the carrier 12 from getting hung up on the wedge 42a.

Thus, the present invention provides an improved carrier for transporting workpieces between stop assembly stations. The carrier provides an improved method for flagging defective workpieces and an improved method of resetting the defect flag. The stop assembly of the present invention provides an improved method for sensing the presence of the carrier, the defective/non-defective status of the workpiece and for grasping and lifting the carrier just above the moving conveyor to allow the conveyor to continue forward as a prescribed assembly task, test or repair is conducted on the workpiece. The configuration of the carrier also enables it to turn sharp corners without interfering with a standard track support. The work stop assembly may also be equipped with an air-assisted release mechanism.

Although only one preferred embodiment of the present invention has been illustrated and described, it will at once be apparent to those skilled in the art that variations may be made within the spirit and scope of the invention. Accordingly, it is intended that the scope of the invention be limited solely by the scope of the hereafter appended claims and not by any specific wording in the foregoing description.

I claim:

1. A combination carrier and precision stop assembly for use in a conveyor system, the combination comprising:

a carrier;

a stop assembly;

the carrier including
an upper surface for supporting a workpiece and an undersurface for frictionally engaging a moving conveyor, means for engaging one side of the stop assembly, means for engaging a second opposing side of the stop assembly, the carrier being vertically raised upon engagement of the two opposing sides of the stop assembly and allowing the conveyor to move forward underneath the carrier without frictionally engaging the undersurface of the carrier, means for receiving an initial braking mechanism to initially stop the carrier upon arrival at the stop assembly, the stop assembly including the initial braking mechanism and means for activating the initial braking system for initially stopping the carrier upon arrival at the stop assembly, means for engaging and lifting opposing sides of the carrier.

2. A combination carrier and precision stop assembly for use in a conveyor system, the combination comprising:

a carrier;

a stop assembly;

the carrier including an upper surface for supporting a workpiece and an undersurface for frictionally engaging a moving conveyor, means for engaging one side of a stop assembly, means for engaging a second opposing side of the stop assembly, the carrier being vertically raised upon engagement of the two opposing sides of the stop assembly and allowing the conveyor to move forward underneath the carrier without frictionally engaging the undersurface of the carrier, means for receiving an initial braking mechanism to initially stop the carrier upon arrival at the stop assembly, the stop assembly including an initial braking mechanism and means for activating the initial braking system for initially stopping the carrier upon arrival at the stop assembly, means for engaging and lifting opposing sides of the carrier, a first sensor, the first sensor detecting the presence of the carrier after the carrier is initially stopped by the initial braking mechanism, means for communicating the presence of the carrier to a programmable controller upon the arrival of the carrier at the stop assembly.

3. A combination carrier and precision stop assembly for use in a conveyor system, the combination comprising:

a carrier;

a stop assembly;

the carrier including an upper surface for supporting a workpiece and an undersurface for frictionally engaging a moving conveyor, means for engaging one side of the stop assembly, means for engaging a second opposing side of the stop assembly, the carrier being vertically raised upon engagement of the two opposing sides of the stop assembly and allowing the conveyor to move forward underneath the carrier without frictionally engaging the undersurface of the carrier, a reject pin disposed in the carrier, the reject pin including at least two positions, one position indicating that the workpiece is defective, another position indicating the workpiece is not effective, the stop assembly including an initial braking mechanism and means for activating the initial braking system for initially stopping the carrier upon arrival at the stop assembly, means for engaging and lifting opposing sides of the carrier, a reset piston and means for activating the reset piston, a programmable controller activates the means for activating the reset piston, the reset piston thereafter engaging the reject pin and moving the reject pin from the position indicating that the workpiece is defective to the position indicating the workpiece is not defective.

4. A combination carrier and precision stop assembly for use in a conveyor system, the combination comprising:

a carrier;

a stop assembly;

the carrier including an upper surface for supporting a workpiece and an undersurface for frictionally engaging a moving conveyor, means for engaging one side of the stop assembly, means for engaging a second opposing side of the stop assembly, the carrier being vertically raised upon engagement of the two opposing sides of the stop assembly and allowing the conveyor to move forward underneath the carrier without frictionally engaging the undersurface of the carrier, the stop assembly including an initial braking mechanism and means for activating the initial braking system for initially stopping the carrier upon arrival at the stop assembly, means for engaging and lifting opposing sides of the carrier, a first sensor, the first sensor detecting the presence of the carrier after the carrier is initially stopped by the initial braking mechanism, means for communicating the presence of the carrier to a programmable controller upon the arrival of the carrier at the stop assembly, a second sensor, the second sensor detecting the position of the reject pin, means for communicating the position of the reject pin to a programmable controller, the programmable controller activating the means for engaging and lifting opposing sides of the carrier only when the reject pin is in the position indicating the workpiece is not defective.

5. A carrier for use in a conveyor system, the carrier comprising:

an upper surface for supporting a workpiece and an undersurface for frictionally engaging a moving conveyor, means for engaging one side of a stop assembly, means for engaging a second opposing side of the stop assembly, a reject pin disposed in the carrier, the reject pin including two positions, one position indicating that the workpiece is defective, another position indicating the workpiece is not defective.

6. The carrier of claim 5, further including means for receiving an initial braking mechanism to initially stop the carrier upon arrival at the stop assembly.

7. The carrier of claim 5, wherein the carrier is further characterized as including a front end, a rear end, a middle portion and two sides, at least one side including an arcuate undercut for accommodating a turn in the conveyor system the front and rear end including curved vertical surfaces to prevent interference with preceding and succeeding carriers.

8. The carrier of claim 6, wherein one side of the carrier includes a metallic block capable of detection by a proximity sensor.

9. The carrier of claim 7, wherein at least one side toward the rear end includes a rear slot, the rear slot extending rearward out the rear end, the rear slot accommodating an initial braking mechanism thereby enabling the initial braking system to be activated in anticipation of a succeeding carrier before the carrier fully departs from the stop assembly.

10. A stop assembly for stopping and receiving carrier units of a moving conveyor assembly system, the stop assembly comprising:

an initial braking mechanism and means for activating an initial braking system for initially stopping a carrier upon arrival at the stop assembly, a first sensor for detecting the presence of the carrier, means for communicating the presence of the carrier to a programmable controller, a second sensor detecting a position of a reject pin disposed on the carrier, means for communicating the position of the reject pin to a programmable controller, means for engaging and lifting opposing sides of the carrier, the carrier unit being vertically raised upon engagement of the opposing sides of the carrier and allowing the conveyor to move forward underneath the carrier without frictionally engaging an undersurface of the carrier.

11. The stop assembly of claim 10, wherein the first sensor further detects the departure of the carrier from the stop assembly, the stop assembly further including means for communicating the departure of the carrier to the programmable controller, the programmable controller instituting activation of the initial braking mechanism to initially stop a succeeding carrier.

12. A combination carrier and precision stop assembly for use in a conveyor system, the combination comprising:

a carrier;

a stop assembly;

the carrier including an upper surface for supporting a workpiece and an undersurface for frictionally engaging a moving conveyor, means for engaging one side of the stop assembly, means for engaging a second opposing side of the stop assembly, the carrier being vertically raised upon engagement of the two opposing sides of the stop assembly and allowing the conveyor to move forward underneath the carrier without frictionally engaging the undersurface of the carrier, means for receiving an initial braking mechanism to initially stop the carrier upon arrival at the stop assembly, the stop assembly including an initial braking mechanism and means for activating the initial braking system for initially stopping the carrier upon arrival at the stop assembly, means for engaging and lifting opposing sides of the carrier, means for releasing the carrier from said means for engaging and lifting opposing sides of the carrier.

13. The combination carrier and precision stop assembly of claim 12, wherein the means releasing the carrier includes a pressurized flow of air outward from one side of the stop assembly onto the carrier thereby disengaging the carrier from said one side of the stop assembly.

14. A stop assembly for stopping and receiving carrier units of moving conveyor assembly system, the stop assembly comprising:

an initial braking mechanism and means for activating the initial braking system for initially stopping a carrier upon arrival at the stop assembly, a sensor for detecting a position of a reject pin disposed on the carrier, means for communicating the position of the reject pin to a programmable controller, means for engaging and lifting opposing sides of the carrier, the carrier unit being vertically raised upon engagement of the opposing sides of the carrier and allowing the conveyor to move forward underneath the carrier without frictionally engaging an under surface of the carrier.

15. The stop assembly of claim 14 further comprising means for releasing the carrier from said means for engaging and lifting opposing sides of the carrier.

16. The stop assembly of claim 15, wherein the means releasing the carrier includes a pressurized flow of air outward from one side of the stop assembly onto the carrier thereby disengaging the carrier from said one side of the stop assembly.

17. A combination carrier and precision stop assembly for use in a conveyor system, the combination comprising:

a carrier;

a stop assembly;

the carrier including means for engaging the stop assembly, the carrier being vertically raised upon engagement of the stop assembly and allowing a conveyor to move forward underneath the carrier without frictionally engaging the carrier, means for receiving an initial braking mechanism to initially stop the carrier upon arrival at the stop assembly, the stop assembly including the initial braking mechanism and means for activating the initial braking system for initially stopping the carrier upon arrival at the stop assembly, means for engaging and lifting the carrier.

18. A carrier for use in a conveyor system, the carrier comprising:

means for engaging a stop assembly, a reject pin disposed in the carrier, the reject pin including two positions, one position indicating that the workpiece is defective, another position indicating the workpiece is not defective.

19. A stop assembly for stopping and receiving carrier units of a moving conveyor assembly system, the stop assembly an initial braking mechanism and means for activating an initial braking system for initially stopping a carrier upon arrival at the stop assembly, a first sensor for detecting the presence of the carrier, means for communicating the presence of the carrier to a programmable controller, a second sensor detecting a position of a reject pin disposed on the carrier, means for communicating the position of the reject pin to a programmable controller, means for engaging and lifting the carrier thereby allowing the conveyor to move forward underneath the carrier without frictionally engaging an undersurface of the carrier.

20. A stop assembly for stopping and receiving carrier units of a moving conveyor assembly system, the stop assembly comprising:

an initial braking mechanism and means for activating an initial braking system for initially stopping a carrier upon arrival at the stop assembly, a first sensor for detecting the presence of the carrier, means for communicating the presence of the carrier to a programmable controller, a second sensor detecting a position of a reject pin disposed on the carrier, means for communicating the position of the reject pin to a programmable controller.

21. A stop assembly for stopping and receiving carrier units of a moving conveyor assembly system, the stop assembly comprising:

an initial braking mechanism and means for activating an initial braking system for initially stopping a carrier upon arrival at the stop assembly, means for engaging and lifting the carrier thereby allowing the conveyor to move forward underneath the carrier without frictionally engaging an undersurface of the carrier.

* * * * *